United States Patent [19]
Lee

[11] Patent Number: 5,911,474
[45] Date of Patent: Jun. 15, 1999

[54] BICYCLE SEAT

[76] Inventor: Ralph Lee, 10478 Holman Ave., Los Angeles, Calif. 90024

[21] Appl. No.: 09/020,153

[22] Filed: Feb. 7, 1998

[51] Int. Cl.⁶ .......................................................... B62J 1/00
[52] U.S. Cl. ...................................... 297/201; 297/215.13
[58] Field of Search ................................ 297/195.1, 201, 297/202, 215.13, 215.14, 215.15

[56] References Cited

U.S. PATENT DOCUMENTS

| | | | |
|---|---|---|---|
| 604,347 | 5/1898 | Bray | 297/201 |
| 608,682 | 8/1898 | Jamieson | 297/201 |
| 629,956 | 8/1899 | Craig | 297/201 |
| 4,387,925 | 6/1983 | Barker et al. . | |
| 4,541,668 | 9/1985 | Rouw . | |
| 4,877,286 | 10/1989 | Hobson et al. | 297/201 X |
| 5,123,698 | 6/1992 | Hodges . | |
| 5,352,016 | 10/1994 | Hobson . | |
| 5,387,025 | 2/1995 | Denisar . | |
| 5,709,430 | 1/1998 | Peters | 297/201 |

FOREIGN PATENT DOCUMENTS

| | | | |
|---|---|---|---|
| 94202 | 8/1896 | Germany | 297/201 |

*Primary Examiner*—Peter R. Brown
*Attorney, Agent, or Firm*—Robert E. Malm

[57] ABSTRACT

The invention is a bicycle seat attachable to a bicycle seat post. The bicycle seat comprises a right support section, a left support section, and an attachment device for fixedly attaching the right support section and the left support section to the bicycle seat post. For purposes of description an x-y-z coordinate system fixed with respect to the portion of the attachment device that attaches to the bicycle seat post is defined. The z-axis is aligned with the bicycle seat post, the y-axis is normal to the plane of the bicycle frame, and the x-axis is directed toward the front end of the bicycle when the bicycle seat is properly oriented with respect to the bicycle. The right support section has an angular range of adjustment about a z'-axis, and the left support section has an angular range of adjustment about a z"-axis where the z'-axis and the z"-axis are different axes fixed with respect to the x-y-z coordinate system and within 30 degrees of the z-axis. The right and left support sections together form a support platform for the buttocks of the bicycle rider. The central portion of the support platform has a recess to accommodate the bicycle rider's genitalia.

13 Claims, 2 Drawing Sheets

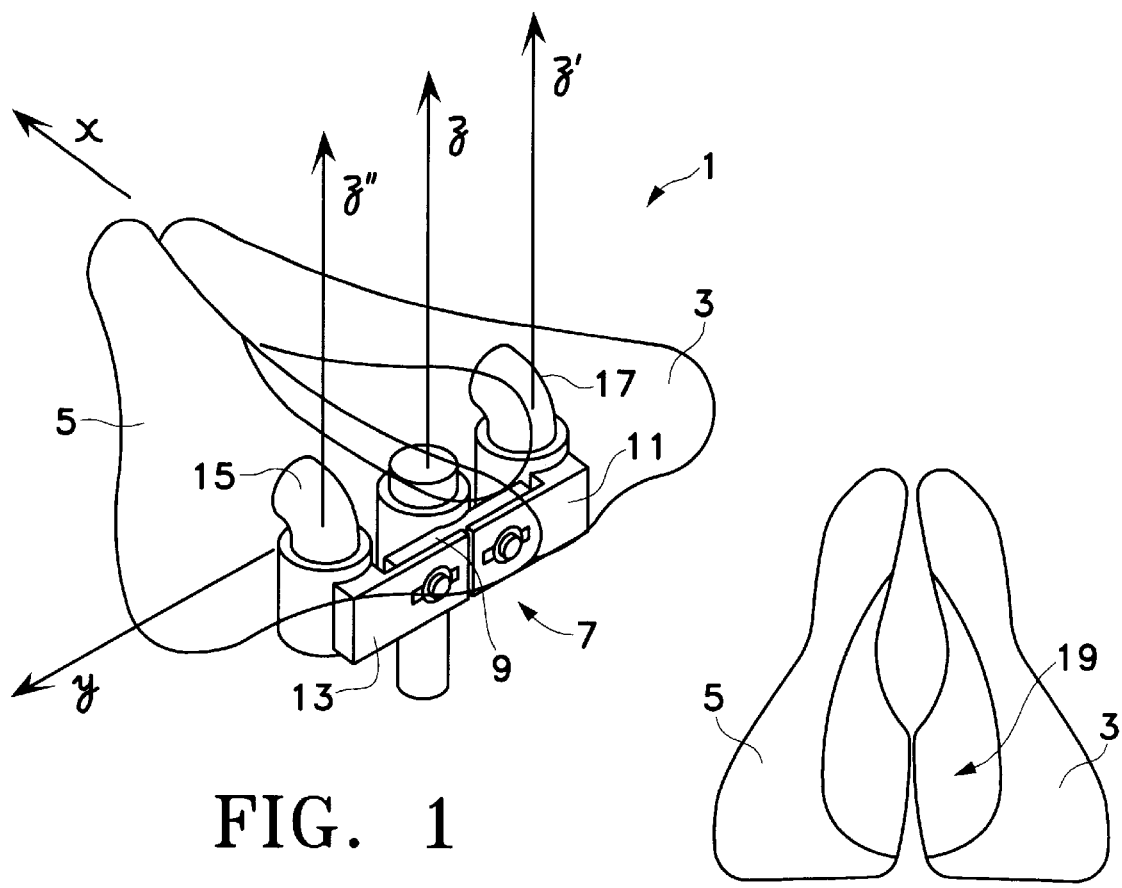
FIG. 1
FIG. 2
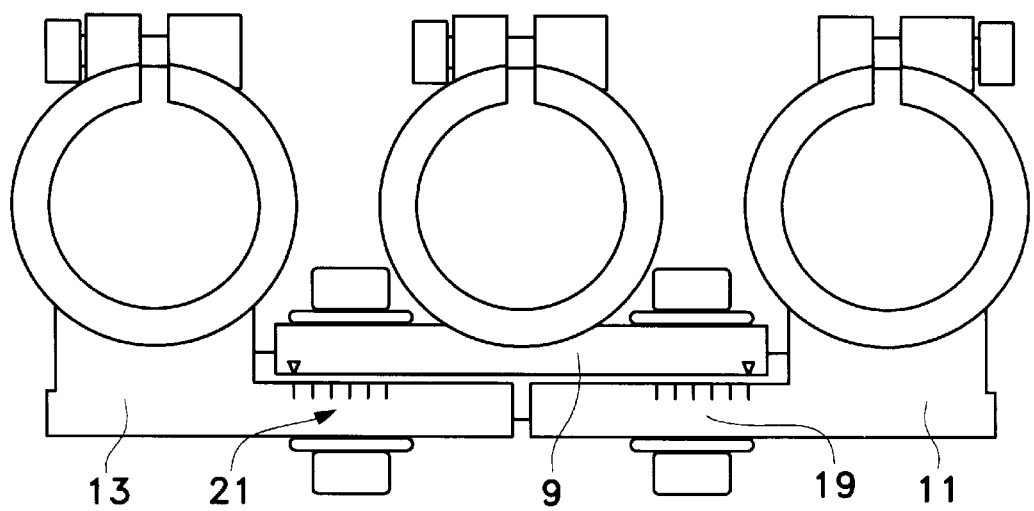
FIG. 3

BICYCLE SEAT

CROSS-REFERENCE TO RELATED APPLICATIONS (NOT APPLICABLE)

STATEMENT REGARDING FEDERALLY-SPONSORED RESEARCH AND DEVELOPMENT (NOT APPLICABLE)

BACKGROUND OF THE INVENTION

This invention relates generally to bicycle seats and more specifically to bicycle seats designed to relieve pressure on the genitalia of bicycle riders.

Bicycle seats are typically one-piece designs which minimize interference with the up and down movement of the rider's legs as he pedals the bicycle. A consequence of these designs is a lack of adequate support for the rider's buttocks and a tendency to exert undue pressure on the rider's genitalia. Recent studies are suggesting that medically undesirable consequences may result from pressure on the genitalia of riders who ride frequently and for extended periods of time.

There is a need for a bicycle seat of simple design and reasonably low cost that facilitates the up and down motion of the rider's legs while at the same time avoiding uncomfortable pressures on the rider's genitalia.

BRIEF SUMMARY OF THE INVENTION

The invention is a bicycle seat attachable to a bicycle seat post. The bicycle seat comprises a right support section, a left support section, and an attachment device for fixedly attaching the right support section and the left support section to the bicycle seat post.

For purposes of description, an x-y-z coordinate system fixed with respect to the portion of the attachment device that attaches to the bicycle seat post is defined. The z-axis is aligned with the bicycle seat post, the y-axis is normal to the plane of the bicycle frame, and the x-axis is directed toward the front end of the bicycle when the bicycle seat is properly oriented with respect to the bicycle.

The right support section has an angular range of adjustment about a z'-axis, and the left support section has an angular range of adjustment about a z"-axis where the z'-axis and the z"-axis are different axes fixed with respect to the x-y-z coordinate system and within 30 degrees of the z-axis.

The right and left support sections together form a support platform for the buttocks of the bicycle rider. The central portion of the support platform has a recess to accommodate the bicycle rider's genitalia

BRIEF DESCRIPTION OF THE DRAWINGS

FIG. 1 is a perspective view of the first preferred embodiment of the invention mounted on a conventional bicycle seat post.

FIG. 2 is a top view of the right and left support sections of the bicycle seat.

FIG. 3 is a top view of the attachment device which provides the means for attaching the right and left support sections to the bicycle seat post.

DETAILED DESCRIPTION OF THE INVENTION

Figure 4:
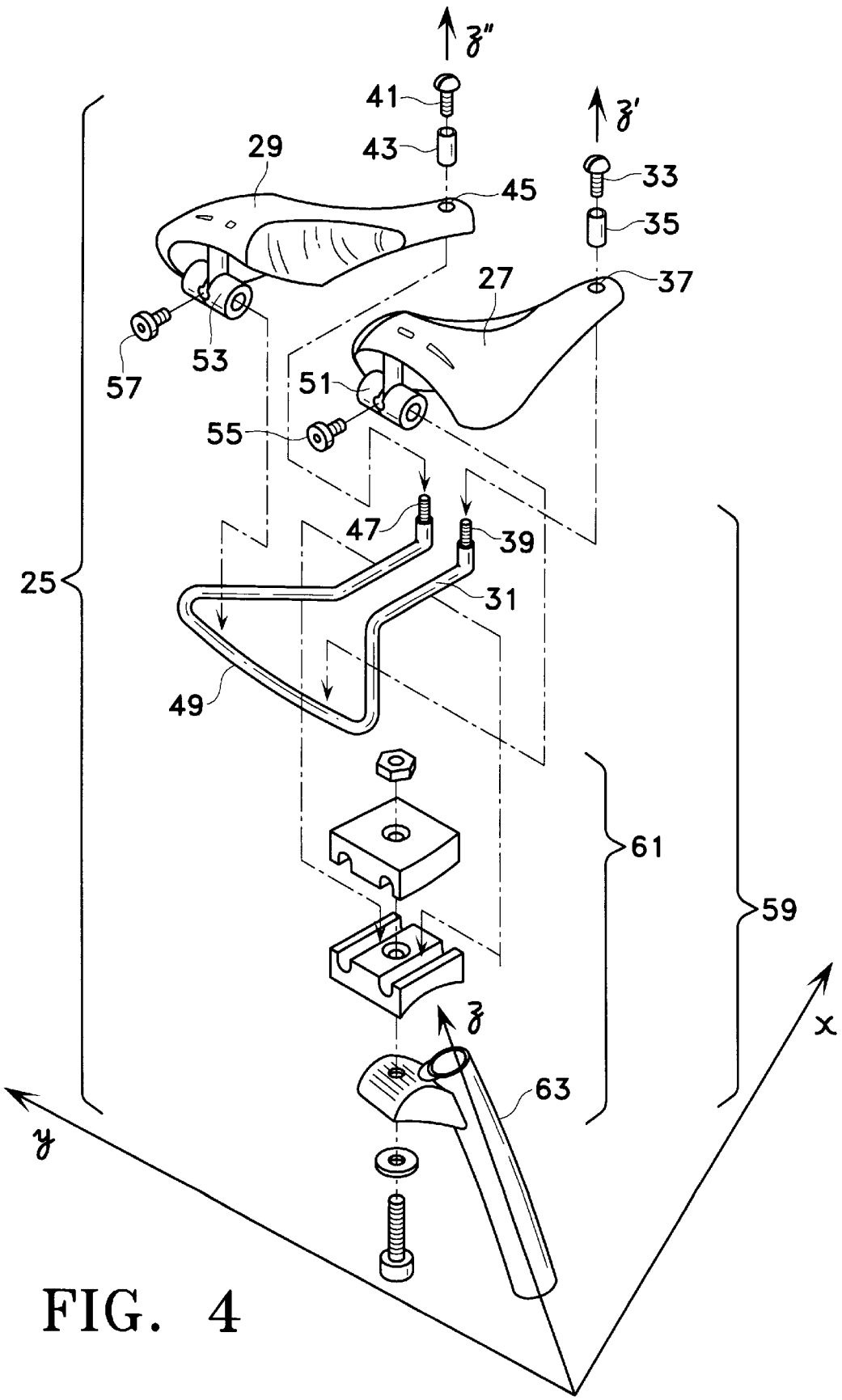
FIG. 4 is an assembly drawing of the second preferred embodiment of the invention.

A perspective view of the first preferred embodiment 1 of the invention is shown in FIG. 1. It consists of a right support section 3, a left support section 5, and an attachment device 7. The left and right support sections 3 and 5 are pictured in FIG. 1 as if they were transparent so as to reveal the details of how the support sections attach to the attachment device 7. The attachment device 7 consists of a seat post member 9, a right member 11, and a left member 13.

The support sections 3 and 5 are similar in construction to present-day bicycle seats except for being asymmetrical. The support sections 3 and 5 are attached to the attachment device 7 by means of seat posts 15 and 17 which are clamped within cylindrical receptacles in right and left members 11 and 13. The seat post member 9 of the attachment device has a cylindrical receptacle which can be clamped to a conventional bicycle seat post.

For reference purposes, we define a right-handed x-y-z coordinate system fixed in the attachment device 7 as shown in FIG. 1. When the bicycle seat is properly installed on a bicycle, the z-axis points upward and is aligned with the bicycle seat post, the y-axis is normal to the plane of the bicycle frame, and the x-axis points to the front of the bicycle and is in the plane of the bicycle frame. We also define a z'-axis parallel to the z-axis and concentric with the cylindrical receptacle which accepts seat post 17 and a z"-axis parallel to the z-axis and concentric with the cylindrical receptacle which accepts seat post 15.

In one preferred embodiment of the invention, the z'-axis and the z"-axis are in the y-z plane. In other preferred embodiments, the z'-axis and the z"-axis are in a plane parallel to the y-z plane. For all preferred embodiments, the z'-axis and the z"-axis are displaced from the x-z plane by equal amounts, the z'-axis in the negative y direction and the z"-axis in the positive y direction.

The y positions of the z'-axis and the z"-axis and thus the y positions of the right and left support sections 3 and 5 are independently adjustable by the constrained movement of right and left members 11 and 13 parallel to the y-axis. The angular orientations of right and left support sections 3 and 5 can be adjusted by rotating right and left support sections about the z'-axis and the z"-axis respectively.

A top view of the right support section 3 and the left support section 5 are shown in FIG. 2. The combination of the two support sections has a perimeter shape somewhat similar to a conventional bicycle seat. What is unique is cavity 19 formed when the two support sections are placed adjacent to one another. The external portions of the sections provide support for the buttocks while cavity 19 accommodates the rider's genitalia. The bicycle seat can be tailored to different riders by adjusting the distance between the two sections. Appropriate leg clearance can be provided by rotating the sections about their seat post axes until the front ends are close enough together to avoid excessive friction between the legs and the sides of the support sections.

A top view of the attachment device 7 is shown in FIG. 3. Constrained movement of the right and left members 11 and 13 in the y-direction is accomplished by a tongue-and-groove arrangement. The y position of the right and left members are indicated by the index marks 19 and 21 respectively.

An assembly drawing of the second preferred embodiment 25 of the invention is shown in FIG. 4. It consists of a right support section 27, a left support section 29, and an attachment device 59. The right support section 27 is rotatably attached to the attachment frame 31 of the attachment device 59 by a machine screw 33 which fits within a nylon sleeve 35 which in turn fits within a hole 37 in the right support section 27. The screw 33 screws into a tapped hole in the post 39.

Similarly, the left support section 29 is rotatably attached to the attachment frame 31 by a machine screw 41 which fits within a nylon sleeve 43 which in turn fits within a hole 45 in the left support section 29. The screw 41 screws into a tapped hole in the post 47.

The rear ends of the right support section 27 and the left support section 29 attach to the slide rail portion 49 of the attachment frame 31 with arcuate jaws 51 and 53 which can be locked in place with set screws 55 and 57.

The attachment device 59 includes a seat bracket 61 of conventional design which attaches the attachment frame 31 to a bicycle seat post 63.

What is claimed is:

1. A bicycle seat attachable to a bicycle seat post, the bicycle seat comprising:

a right support section;

a left support section;

an attachment device for fixedly attaching the right support section and the left support section to the bicycle seat post, an x-y-z coordinate system being fixed with respect to the portion of the attachment device that attaches to the bicycle seat post, the z-axis being aligned with the bicycle seat post, the y-axis being normal to the plane of the bicycle frame, and the x-axis being directed toward the front end of the bicycle when the bicycle seat is properly oriented with respect to the bicycle, the attachment device including a means for adjusting the orientation of the right support section, the right support section having a continuous angular range of adjustment about a z'-axis, the attachment device including a means for adjusting the orientation of the left support section, the left support section having a continuous angular range of adjustment about a z"-axis, the z'-axis and the z"-axis being different axes fixed with respect to the x-y-z coordinate system, the z'-axis and the z"-axis each being within 30 degrees of the z-axis.

2. The bicycle seat of claim 1 wherein the attachment device includes a means for adjusting the positions of the z'-axis and the z"-axis, the z'-axis and the z"-axis each having a range of adjustment parallel to the y-axis.

3. The bicycle seat of claim 2 wherein the spacing between the front-end portions of the right and left support sections increases when the distance between the z'-axis and the z"-axis is increased, the spacing between the front-end portions being restorable to substantially the original spacing by adjusting the angular positions of the right and left support sections about the z'-axis and the z"-axis respectively, the front end portions being the portions closest to the front end of the bicycle.

4. The bicycle seat of claim 1 wherein the right and left support sections together form a support platform for the buttocks of the bicycle rider, the support platform consisting of front portion, a central portion, and a rear portion, the central portion of the support platform having a recess to accommodate the bicycle rider's genitalia.

5. The bicycle seat of claim 4 wherein the attachment device includes a means for adjusting the positions of the z'-axis and the z"-axis, the y-dimension of the recess is increased when the distance between the z'-axis and the z"-axis is increased.

6. The bicycle seat of claim 1 wherein the attachment device comprises:

a seat post member attachable to a bicycle seat post;

a right member slidably attached to the seat post member, the slidability of the right member being along an axis parallel to the z-axis, the z'-axis being fixed with respect to the right member;

a left member slidably attached to the seat post member, the slidability of the left member being along an axis parallel to the y-axis, the z"-axis being fixed with respect to the left member.

7. The bicycle seat of claim 6 wherein the attachment device includes a means for adjusting the position and orientation of the seat post member, the seat post member being adjustable in angle about the z-axis and in position along the z-axis.

8. The bicycle seat of claim 6 wherein the right support section is attachable to the right member and the left support section is attachable to the left member.

9. The bicycle seat of claim 6 wherein the attachment device further comprises:

an indicator means which provides a visual indication of the positions of the right and left members along the y-axis.

10. The bicycle seat of claim 1 wherein the z'-axis and the z"-axis pass through the rights support section and the left support section respectively at the front ends of the right support section and the left support section, the right support section and the left support section being attached to the attachment device in a manner permitting the angular adjustments of the right support section and the left support section about the z'-axis and the z"-axis respectively.

11. The bicycle seat of claim 10 wherein the right support section and the left support section are rotatably attached to the attachment device.

12. The bicycle seat of claim 11 wherein the right support section and the left support section can be locked in position relative to the attachment device after angular adjustment about the z'-axis and the z"-axis.

13. The bicycle seat of claim 11 wherein the rear ends of the right support section and the left support section are fixedly attached to the attachment device, the fixed attachments of the right support section and the left support section to the attachment device being adjustable in order to permit the angular adjustments of the right support section and the left support section about the z'-axis and the z"-axis respectively.

* * * * *